Patented May 7, 1935

2,000,040

UNITED STATES PATENT OFFICE 2,000,040

RUBBER COMPOSITION AND METHOD OF PRESERVING RUBBER

Waldo L. Semon, Silver Lake Village, and Arthur W. Sloan, Akron, Ohio, assignors to The B. F. Goodrich Company, New York, N. Y., a corporation of New York No Drawing. Original application August 22, 1928, Serial No. 301,440. Divided and this application September 15, 1934, Serial No. 744,196

20 Claims. (Cl. 18—50)

This invention relates to the art of preserving rubber, either in the vulcanized or unvulcanized condition, and to rubber compositions so preserved.

It is well known that rubber gradually loses its strength and resiliency, particularly when exposed to light, heat, and air, such deterioration being commonly attributed to an oxidation of the rubber or the rubber composition. Various substances, known generally as age-resisters or antioxidants, have been added to rubber for the purpose of retarding its deterioration. Among the most successful of these substances are the secondary aromatic amines and the condensation products of aldehydes with primary aromatic amines.

This invention, in brief, consists in treating rubber with a member of a new class of age-resisters, namely, condensation products of ketones with primary aromatic amines. Such substances in general have age-resisting properties, but the best results were secured by using the condensation products of amines with aliphatic ketones. It was also found that substituted or condensed ring amines produced more active products than the simpler amines. Thus p-toluidine produces considerably better condensation products than aniline, and alpha-naphthylamine still better. However, any primary aromatic amine, such as aniline, the toluidines, the xylidines, anisidine, phenetedine, p-phenylenediamine, alpha and beta naphthylamine, the naphthylene diamines, mono or diamino-diphenylamine, etc., may be condensed with ketones such as acetophenone, benzophenone, benzoyl acetone, cinnamone, hydroxy benzal acetone, dibenzal acetone, benzoin, etc., but preferably with aliphatic ketones such as acetone, cyclohexanone, acetyl acetone, mesityl oxide, phorone, diacetone alcohol, hydroxy acetone, hydracetyl acetone, etc. The unsaturated or hydroxy-substituted aliphatic ketones appear to give particularly good condensation products with primary aromatic amines. Any one of the above-mentioned class of ketone-amine condensation products may be incorporated into rubber or a rubber composition with beneficial effects on its age-resisting properties, preferably from 0.2 to 5 parts by weight to 100 parts of rubber being used.

Many of these condensation products are oils or viscous liquids which are particularly easy to incorporate into rubber, and which soften unvulcanized rubber stocks and permit them to be worked readily on the calender or tubing machine.

Example 1.—As a specific example of one embodiment of the method of this invention, the condensation product of cyclohexanone and alpha-naphthylamine was prepared by mixing 30 parts by weight of cyclohexanone and 45 parts of alpha-naphthylamine. The mixture was heated under a reflux condenser for 8 hours, during which time the materials reacted and split out water. The excess of unreacted materials was finally removed by distilling up to a temperature of 340° F. A typical tire tread composition was prepared containing blended plantation rubbers 100 parts by weight, sulfur 5.5 parts, zinc oxide 30 parts, gas black 40 parts, mineral rubber 10 parts, palm oil 5 parts, and hexamethylene tetramine 0.75 parts. One part of this was used as a control. To another part was added 0.95 parts by weight (0.5% of the composition) of the condensation product prepared as described above. The compositions were thoroughly mixed, and vulcanized in a press for 45 minutes at 294° F. to produce an optimum cure. The vulcanized compositions were tested to compare their relative rates of aging, by measuring their tensile strength and elongation at the breaking point before and after aging. The accelerated aging was carried out in the Geer aging oven, in which the samples were maintained at a temperature of 158° F. in a constantly renewed current of air. The results are shown in the table below.

*Tensile strength in lbs. per sq. in. and elongation at the breaking point*

|  | Before aging | | After 7 days in the Geer oven | |
|---|---|---|---|---|
|  | Tensile strength | Elongation | Tensile strength | Elongation |
|  |  | Per cent |  | Per cent |
| Without age-resister | 3590 | 667 | 1633 | 495 |
| With age-resister | 3795 | 685 | 2702 | 530 |

Example 2.—As another specific example of the process of this invention a condensation product was prepared by mixing 98 parts by weight of mesityl oxide (1 molecular equivalent) and 143 parts alpha-naphthylamine (1 molecular equivalent) with 0.2 parts sulfuric acid, and heating for 8 hours under a reflux condenser. The product was a very dark syrupy liquid. Rubber compositions were prepared similar to those given above, but containing the mesityl oxide-alpha-naphthylamine condensation product as age-resister. After vulcanization the compositions were tested as before with the following results:

Tensile strength in lbs. per sq. in. and elongation at the breaking point

|  | Before aging | | After 7 days in the Geer oven | |
| --- | --- | --- | --- | --- |
|  | Tensile strength | Elongation | Tensile strength | Elongation |
|  |  | Per cent |  | Per cent |
| Without age-resister | 3809 | 690 | 1775 | 403 |
| With age-resister | 3807 | 687 | 2748 | 553 |

Example 3.—As another specific example of the process of this invention, condensation products were prepared of diacetone alcohol with aniline and with alpha naphthylamine in approximately equimolecular proportions. In the one case 120 parts by weight of diacetone alcohol were mixed with 93 parts of aniline, and in the other case with 143 parts of alpha naphthylamine, and the mixtures were heated to drive off the water formed by the reaction. The products were respectively dark red and black syrupy liquids. The products were incorporated into rubber compositions and the vulcanized compositions tested before and after aging as in Example 1 above, with the following results:

Tensile strength in lbs. per sq. in. and elongation at the breaking point

|  | Before aging | | After 7 days in the Geer oven | |
| --- | --- | --- | --- | --- |
|  | Tensile strength | Elongation | Tensile strength | Elongation |
|  |  | Per cent |  | Per cent |
| Without age-resister | 3628 | 623 | 2013 | 450 |
| With diacetone alcohol-aniline | 3782 | 627 | 2381 | 500 |
| With diacetone alcohol-alpha naphthylamine | 3636 | 638 | 2997 | 573 |

From the examples given above it is evident that the condensation products of ketones and aromatic amines are extremely effective in retarding the deterioration which rubber normally undergoes upon aging. Obviously the proportions of the materials used in the rubber composition may be varied to meet any individual requirements, or rubber compositions of a widely different nature, such as inner tube, tire friction, hose cover, pure gum thread or other compositions may be employed, the beneficial effect of the addition of a ketone-amine condensation product being observed in general in rubber exposed to oxidation. These condensation products may also be applied to unvulcanized or vulcanized rubber with good effect on the age-resisting properties of the rubber, such as by applying them to the surface of the rubber, as for example in solution, or in the form of a paste or emulsion.

It is to be understood that the term "treating" as employed in the appended claims is used in a generic sense to include either the incorporation of the condensation products of ketones and aromatic amines into the rubber by milling or similar process, or by mixing with the rubber latex before coagulation, or to the application thereof to the surface of a mass of crude or vulcanized rubber. The term "rubber" is likewise employed in the claims in a generic sense to include caoutchouc, balata, gutta percha, rubber isomers and like products, whether or not admixed with fillers, pigments, vulcanizing or accelerating agents. The word "aryl" is herein employed to refer to univalent aromatic hydrocarbon radicals whose free valence belongs to the nucleus and not to a side chain.

While we have herein disclosed with considerable particularity certain preferred manners of performing our invention, we do not thereby desire or intend to limit ourselves solely thereto, for, as hitherto stated, the precise proportions of the materials utilized may be varied and other materials having equivalent chemical properties may be employed if desired without departing from the spirit and scope of the invention as defined in the appended claims.

This is a division of our copending application Serial No. 301,440 filed August 22, 1928.

We claim:

1. The method of preserving rubber which comprises treating rubber with a reaction product of a ketone containing not more than two oxygen atoms with an aromatic amine derived from benzene or an alkyl or alkoxy substituted benzene and containing only one primary amino group.

2. The method of preserving rubber which comprises treating rubber with a reaction product of an aliphatic ketone containing not more than two oxygen atoms with an aromatic amine derived from benzene or an alkyl or alkoxy substituted benzene and containing only one primary amino group.

3. The method of preserving rubber which comprises treating rubber with a reaction product of acetone with an aromatic amine derived from benzene or an alkyl or alkoxy substituted benzene and containing only one primary amino group.

4. The method of preserving rubber which comprises treating rubber with a reaction product of a ketone containing not more than two oxygen atoms with a primary arylamine in which the aryl radical is derived from a hydrocarbon of the benzene homologous series.

5. The method of preserving rubber which comprises treating rubber with a reaction product of an aliphatic ketone containing not more than two oxygen atoms with a primary arylamine in which the aryl radical is derived from a hydrocarbon of the benzene homologous series.

6. The method of preserving rubber which comprises treating rubber with a reaction product of acetone with a primary arylamine in which the aryl radical is derived from a hydrocarbon of the benzene homologous series.

7. The method of preserving rubber which comprises treating rubber with a reaction product of a ketone containing not more than two oxygen atoms with aniline.

8. The method of preserving rubber which comprises treating rubber with a reaction product of an aliphatic ketone containing not more than two oxygen atoms with aniline.

9. The method of treating rubber which comprises treating rubber with the reaction product of acetone and aniline.

10. The method of preserving rubber which comprises treating rubber with a reaction product of an aliphatic ketone containing not more than two oxygen atoms with toluidine.

11. The method of treating rubber which comprises treating rubber with the reaction product of acetone and o-toluidine.

12. The method of preserving rubber which comprises treating rubber with a reaction product of diacetone alcohol with a primary arylamine in which the aryl group is derived from a hydrocarbon of the benzene homologous series.

13. The method of treating rubber which comprises treating rubber with a reaction product of diacetone alcohol and aniline.

14. The method of preserving rubber which comprises vulcanizing rubber containing a reaction product of acetone with aniline.

15. The method of preserving rubber which comprises vulcanizing rubber in the presence of the reaction product of diacetone alcohol and aniline.

16. A composition of matter comprising rubber and a reaction product of a ketone containing not more than two oxygen atoms with a primary arylamine in which the aryl radical is derived from a hydrocarbon of the benzene homologous series.

17. A composition of matter comprising rubber and a reaction product of acetone and aniline.

18. A composition of matter comprising rubber and a reaction product of acetone and o-toluidine.

19. A composition of matter comprising rubber and the reaction product of diacetone alcohol and aniline.

20. A vulcanized rubber composition which has been vulcanized in the presence of the reaction product of acetone and aniline.

WALDO L. SEMON.
ARTHUR W. SLOAN.